United States Patent
Nowicki et al.

(10) Patent No.: US 12,305,826 B1
(45) Date of Patent: May 20, 2025

(54) SENSOR COVER FOR VEHICLE LAMP ASSEMBLY

(71) Applicant: Ford Global Technologies, LLC, Dearborn, MI (US)

(72) Inventors: Nicholas James Nowicki, Southgate, MI (US); Scott Aaron Ford, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/903,107

(22) Filed: Oct. 1, 2024

(51) Int. Cl.
 F21S 43/20 (2018.01)
 F21S 43/27 (2018.01)
 G01S 13/931 (2020.01)

(52) U.S. Cl.
 CPC ........... F21S 43/281 (2024.05); F21S 43/265 (2024.05); F21S 43/27 (2018.01); *G01S 2013/93277* (2020.01)

(58) Field of Classification Search
 CPC ........ F21S 43/281; F21S 43/27; F21S 43/265; G01S 2013/93277
 See application file for complete search history.

(56) References Cited

U.S. PATENT DOCUMENTS

| | | | |
|---|---|---|---|
| 11,002,418 B1* | 5/2021 | Hollinger | ............... F21S 9/037 |
| 11,708,955 B2 | 7/2023 | Aizawa | |
| 11,878,622 B2 | 1/2024 | Katsurada et al. | |
| 2003/0174053 A1* | 9/2003 | Rennick | ................. G01S 7/521 340/425.5 |
| 2008/0158897 A1 | 7/2008 | Nakamura et al. | |
| 2008/0180965 A1 | 7/2008 | Nakamura et al. | |
| 2010/0135033 A1* | 6/2010 | Leary | ...................... F21S 8/003 362/382 |
| 2011/0279304 A1 | 11/2011 | Yonemoto et al. | |
| 2017/0158111 A1 | 6/2017 | Zawacki et al. | |
| 2021/0010662 A1* | 1/2021 | Dixit | ......................... F21S 8/04 |
| 2021/0237648 A1* | 8/2021 | Lettis | ..................... B60R 1/081 |
| 2021/0245652 A1* | 8/2021 | Kamal | ............... F21V 23/0471 |
| 2021/0356104 A1* | 11/2021 | Thorne | ............... H01M 50/262 |
| 2023/0266435 A1 | 8/2023 | Nakayama et al. | |

FOREIGN PATENT DOCUMENTS

| | | |
|---|---|---|
| CN | 217404524 U | 9/2022 |
| TR | 202013057 A1 | 3/2022 |
| WO | 2023120238 A1 | 6/2023 |

* cited by examiner

Primary Examiner — Christopher E Dunay
(74) Attorney, Agent, or Firm — Vichit Chea; Carlson, Gaskey & Olds, P.C.

(57) ABSTRACT

This disclosure relates to a sensor cover for a vehicle lamp assembly. The lamp assembly may include a housing and may further include a sensor. The lamp assembly may also include a cover configured to support the sensor relative to the housing. The cover may be configured to connect to the housing without the use of tools.

19 Claims, 3 Drawing Sheets

SENSOR COVER FOR VEHICLE LAMP ASSEMBLY

TECHNICAL FIELD

This disclosure relates to a sensor cover for a vehicle lamp assembly.

BACKGROUND

Vehicles are known to have lamp assemblies, such as tail lamp assemblies, that include one or more sensors to monitor the areas alongside and behind the vehicle, including sensors configured to detect objects that may be adjacent the vehicle.

SUMMARY

In some aspects, the techniques described herein relate to a lamp assembly for a motor vehicle, including: a housing; a sensor; and a cover configured to support the sensor relative to the housing, wherein the cover is configured to connect to the housing without the use of tools.

In some aspects, the techniques described herein relate to a lamp assembly, wherein the cover is rotatable relative to the housing between: a first rotational orientation in which the cover may be selectively attached and detached from the housing, and a second rotational orientation in which the cover and housing are configured to establish an interference fit.

In some aspects, the techniques described herein relate to a lamp assembly, wherein the cover and housing are configured such that the cover rotates substantially 90° relative to the housing when moving between the first rotational orientation and the second rotational orientation.

In some aspects, the techniques described herein relate to a lamp assembly, wherein the housing includes an orifice configured to receive at least a portion of the cover and at least a portion of the sensor.

In some aspects, the techniques described herein relate to a lamp assembly, wherein the orifice is defined about an axis, and wherein the cover is configured to rotate about the axis when between the first rotational orientation and the second rotational orientation.

In some aspects, the techniques described herein relate to a lamp assembly, wherein the cover and the sensor are configured to be at least partially inserted into, or removed from, the orifice when the cover is in the first rotational orientation.

In some aspects, the techniques described herein relate to a lamp assembly, wherein, when the cover and the sensor are at least partially in the orifice, movement of the cover to the second rotational orientation establishes an interreference fit between the cover and the housing.

In some aspects, the techniques described herein relate to a lamp assembly, wherein, when the cover and the sensor are at least partially in the orifice and when the cover is in the second rotational orientation, the sensor is directed toward one or both of a side and a rear of the motor vehicle.

In some aspects, the techniques described herein relate to a lamp assembly, wherein the sensor is an Advanced Driver Assistance System (ADAS) sensor.

In some aspects, the techniques described herein relate to a lamp assembly, wherein: the cover includes a lip, and the lip is configured to project into an orifice of the housing when the cover is in the first rotational orientation.

In some aspects, the techniques described herein relate to a lamp assembly, wherein: the cover includes a main body section configured to cover the sensor and the orifice from at least one perspective when the cover is connected to the housing.

In some aspects, the techniques described herein relate to a lamp assembly, wherein: the lip is substantially circular, and a seal supported on the lip is configured to establish a seal between the cover and the housing when the cover is connected to the housing.

In some aspects, the techniques described herein relate to a lamp assembly, wherein: the lip includes at least one tab projecting outwardly therefrom, the orifice is arranged about an axis, and when the cover is connected to the housing and when the cover is in the second rotational orientation, the arrangement of the at least one tab relative to the housing restricts movement of the cover along the axis.

In some aspects, the techniques described herein relate to a lamp assembly, wherein: when the cover is in the first rotational orientation, the arrangement of the at least one tab relative to the housing does not restrict movement of the cover along the axis.

In some aspects, the techniques described herein relate to a lamp assembly, wherein the cover includes a frame configured to support the sensor.

In some aspects, the techniques described herein relate to a lamp assembly, wherein: the frame includes a plurality of support assemblies, each support assembly includes a slot and a deflectable leg biased toward a center of the slot, and a housing of the sensor includes projections configured to be received in a respective one of the slots and such that a respective deflectable leg applies a force thereto.

In some aspects, the techniques described herein relate to a lamp assembly, wherein each deflectable leg includes a tab and each projection includes a recess configured to receive a corresponding one of the tabs.

In some aspects, the techniques described herein relate to a method, including: attaching a cover to a housing of a lamp assembly for a motor vehicle, wherein the cover supports a sensor, and wherein the cover is attached to the housing without the use of tools.

In some aspects, the techniques described herein relate to a method, wherein the attaching step includes: partially inserting the cover into an orifice in the housing by moving the cover along an axis about which the orifice is formed when the cover is in a first rotational orientation, and rotating the cover relative to the housing into a second rotation orientation to establish an interference fit between the cover and the housing.

In some aspects, the techniques described herein relate to a method, wherein the attaching step establishes a seal between the cover and the housing via seal arranged between the cover and the housing.

DETAILED DESCRIPTION

This disclosure relates to a cover for a sensor (i.e., a "sensor cover" or simply a "cover"). The cover may be configured to cover an Advanced Driver Assistance System (ADAS) sensor. Further, the cover may be configured to connect to a vehicle lamp assembly without the use of tools. The cover may be considered part of the lamp assembly.

This disclosure provides a number of benefits, including increasing the ease of connecting and disconnecting a sensor from the remainder of the lamp assembly, and establishing a robust seal between the cover and the remainder of the lamp assembly. These and other benefits will be appreciated from the below description.

Figure 1:
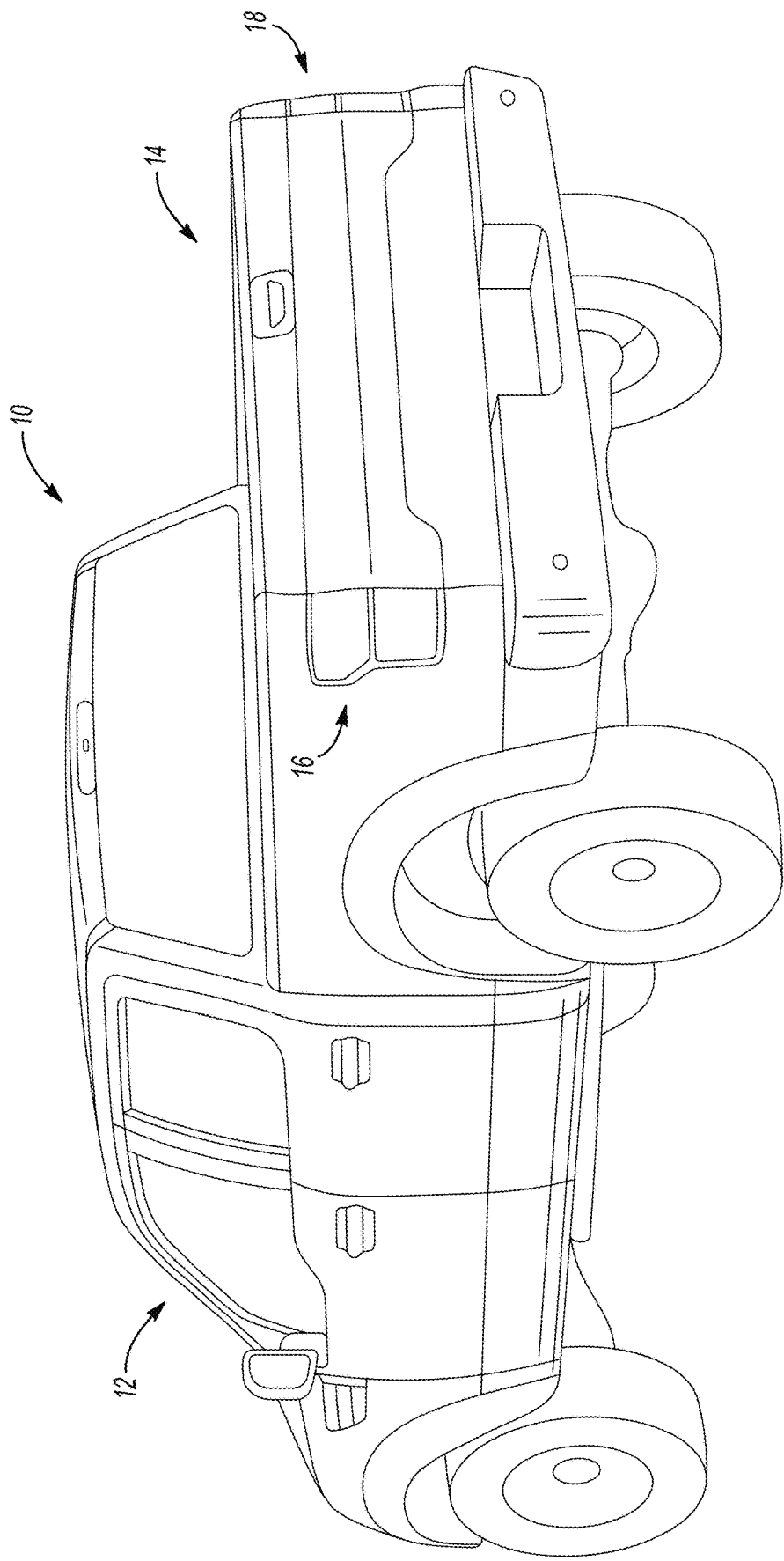
FIG. 1 is a rear-perspective view of a motor vehicle, which in this example is a pickup truck.

FIG. 1 illustrates a motor vehicle 10 ("vehicle 10"), which in this example is a pickup truck. This disclosure could extend to other vehicles besides pickup trucks, such as sport utility vehicles (SUVs), sedans, crossovers, vans, etc.

The vehicle 10 includes a passenger cabin 12 and, rearward of the passenger cabin 12, a cargo area 14. The vehicle 10 further includes a number of lamp assemblies, including first and second rear tail lamp assemblies 16, 18.

Figure 2:
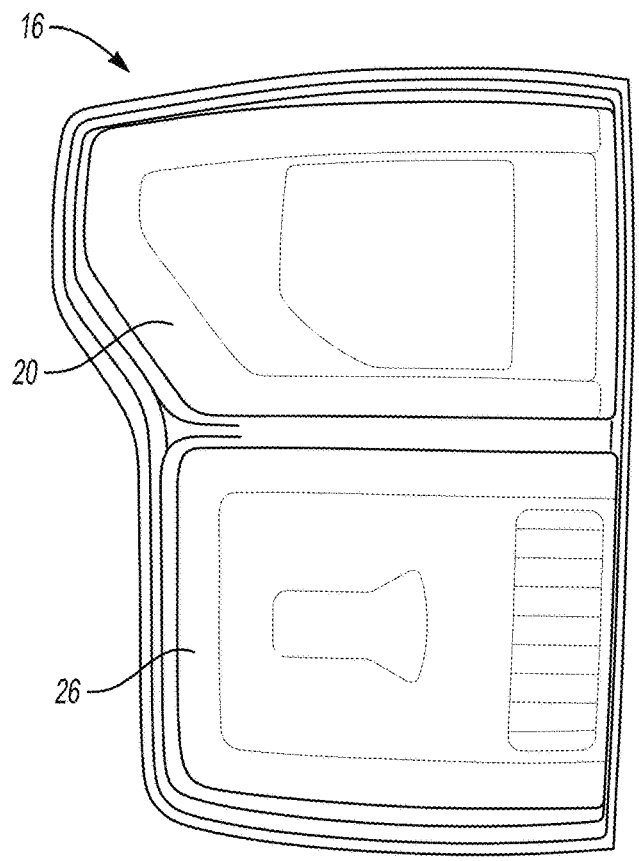
FIG. 2 is a view of a tail lamp assembly from an exterior perspective.
Figure 3:
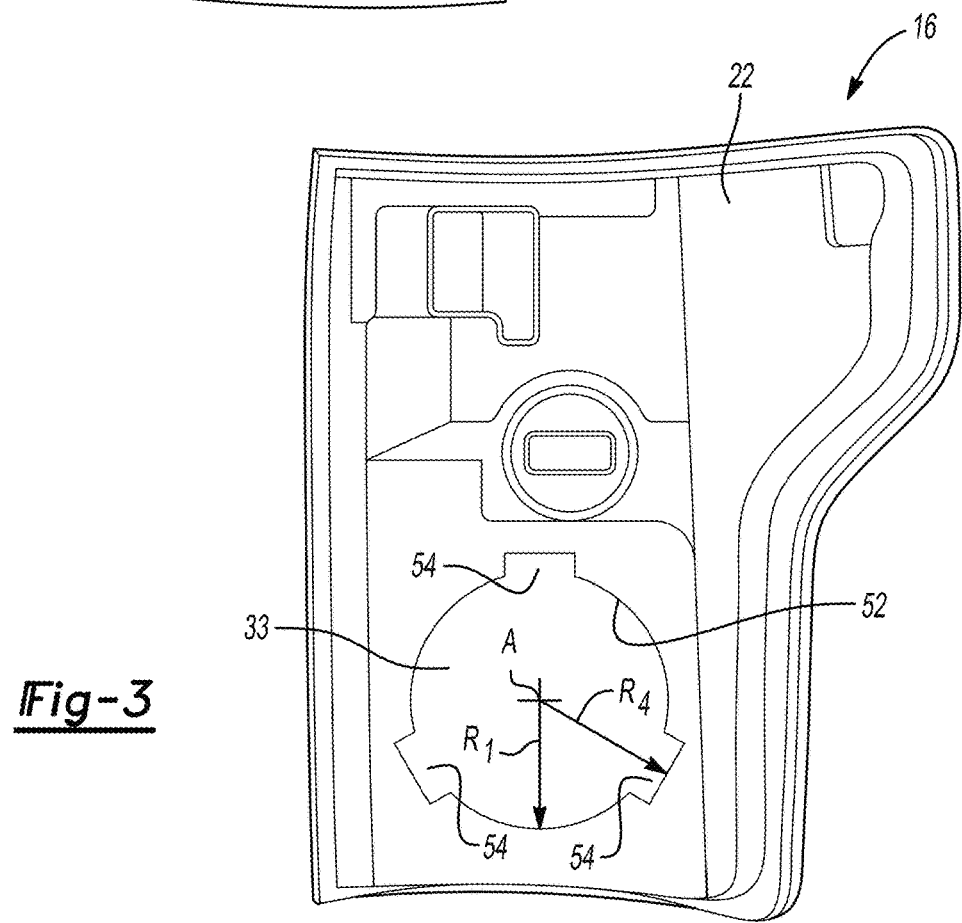
FIG. 3 is a view of the tail lamp assembly from an opposite perspective as in FIG. 2.

The tail lamp assembly 16 is shown in more detail in FIGS. 2 and 3. While the tail lamp assembly 16 is shown and described relative to FIGS. 2 and 3, the tail lamp assembly 18 could be configured substantially similarly. Further, this disclosure is not limited to configurations for tail lamp assemblies, and extends to other lamp assemblies of a vehicle, including head lamps, center high-mounted stop lamps (CHMSL), and other lamp assemblies. This disclosure also extends to assemblies that are not lamp assemblies, such as sensor assemblies or body assemblies that are independent of lamps.

With joint reference to FIGS. 2 and 3, the tail lamp assembly 16 includes a lens 20 made of plastic or glass, one or more reflectors, and one or more bulbs configured to selectively illuminate and direct light through the lens 20. The lens 20 is supported by a housing 22. The housing 22 serves as a main body of the tail lamp assembly 16 and holds and supports the lens, bulb, reflector, and any electronics contained within the tail lamp assembly 16. The housing 22 is configured to mount relative to the body of the vehicle 10.

The tail lamp assembly 16 of this disclosure further incorporates a sensor 24 (FIG. 4) configured to emit radio waves, for example, and measure reflections that bounce back from objects adjacent the vehicle 10. A portion 26 of the lens 20 is configured to permit such signals to pass through the lens 20, including signals passing both to and from the sensor 24. The sensor 24 is mounted relative to the housing 22 in the location of the portion 26. When the sensor 24 is mounted relative to the portion 26, the sensor 24 is directed toward one or both of a side and a rear of the vehicle 10.

The sensor 24 is an Advanced Driver Assistance System (ADAS) sensor. In a particular example, the sensor 24 is a radar sensor used in a Blind Spot Information System (BLIS), adaptive cruise control, or another system of the vehicle 10. The sensor 24 could be another type of sensor, such as an ultrasonic sensor, lidar sensor, camera, or infrared sensor, as examples.

Figure 4:
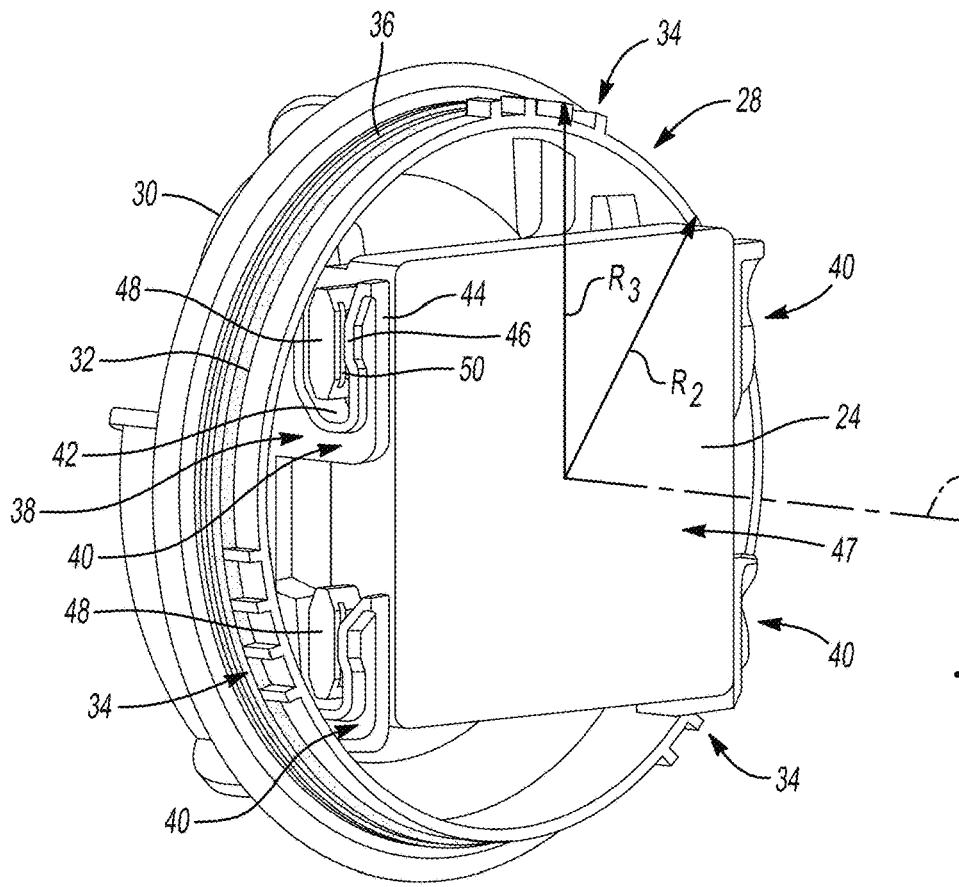
FIG. 4 is a perspective view of an example cover and sensor of this disclosure.

With reference to FIG. 4, the sensor 24 is supported by a cover 28. The cover 28 is configured to connect to the housing 22 to support the sensor 24 relative to the housing 22 such that the sensor 24 is in the location of the portion 26 and is able to function as intended. The cover 28 is shown connected to housing 22 in FIG. 5.

In a particular aspect of this disclosure, the cover 28 is configured to connect to the housing 22 without the use of tools. In other words, the cover 28 is configured to connect to the housing 22 manually by a user, by hand.

The cover 28 includes a main body portion 30. When the cover 28 is connected to the housing 22, the main body portion 30 covers an orifice 33 in the housing 22, when viewed from the perspective of FIG. 3. The cover 28 further includes a lip 32 projecting from the main body portion 30 in a direction parallel to a center C of the cover 28. The lip 32 is substantially circular when the cover 28 is viewed from an end (i.e., from the right-hand side, relative to FIG. 4). The lip 32 establishes a continuous, uninterrupted circumference about the center C in this example.

The lip 32 includes at least one tab 34 projecting outwardly therefrom, and in particular radially outward therefore, relative to the center C of the cover 28. In the example of FIG. 4, the lip 32 includes three tabs 34, each equally spaced-apart from one another about the circumference of the lip 32. The tabs 34, in the example of FIG. 4, each include a plurality of ribs. The tabs 34 are not required to include ribs. Further, this disclosure extends to covers with a different number of tabs 34.

The lip 32 further includes a seal 36. The seal 36 is supported on the lip 32 and is configured to establish a seal between the cover 28 and the housing 22 when the cover 28 is connected to the housing 22. The seal 36 is substantially circular in this example, and in particular is provided by an O-ring. The seal 36 is made of an elastomeric material in this example. In part because the seal 36 lacks any sharp corners, such as those found on seals exhibiting rectangular shapes, the seal 36 provides robust resistance to the ingress of environmental elements, such as dust, water, moisture, and debris, relative to the interior of the housing 22 (i.e., the space between the housing 22 and the lens 20).

Inward of the lip 32, the cover 28 includes a frame 38 configured to support the sensor 24. The frame 38 includes a plurality of support assemblies 40. In this example, there are four support assemblies 40, with two support assemblies 40 on each side of the sensor 24. One of the support assemblies 40 will be described in more detail. It should be understood that each of the support assemblies 40 is configured substantially similarly.

The support assembly 40 includes a slot 42 and a deflectable leg 44 biased toward the center of the slot 42. The deflectable leg 44 includes a tab, or tab portion, 46 projecting toward the center of the slot 42 from the remainder of the deflectable leg 44.

The sensor 24, in this example, includes a substantially rectangular cuboid-shaped housing 47, and a plurality of projections 48. In this particular example the sensor 24 includes four projections 48, each of which is configured to fit in a corresponding one of the slots 42. With reference to one of the projections 48, the projection 48 includes a groove or recess 50 configured to receive the tab 46 of a respective deflectable leg 44. Each of the projections 48 is configured substantially similarly. The interface between the tabs 46 and the recesses 50 maintains the position of the sensor 24 relative to the cover 28.

With reference back to FIG. 3, the orifice 33 is defined by an edge 52 of the housing 22. The edge 52 is primarily circular, arranged about a central axis A (which extends in and out of the page in FIG. 3) of the orifice 33, with the exception of at least one notch 54. In this example, the edge 52 includes three notches 54. The notches 54 are equally spaced-apart from one another about the axis A, in this example. The arrangement of the notches 54 substantially mirrors the arrangement of the tabs 34.

Figure 5:
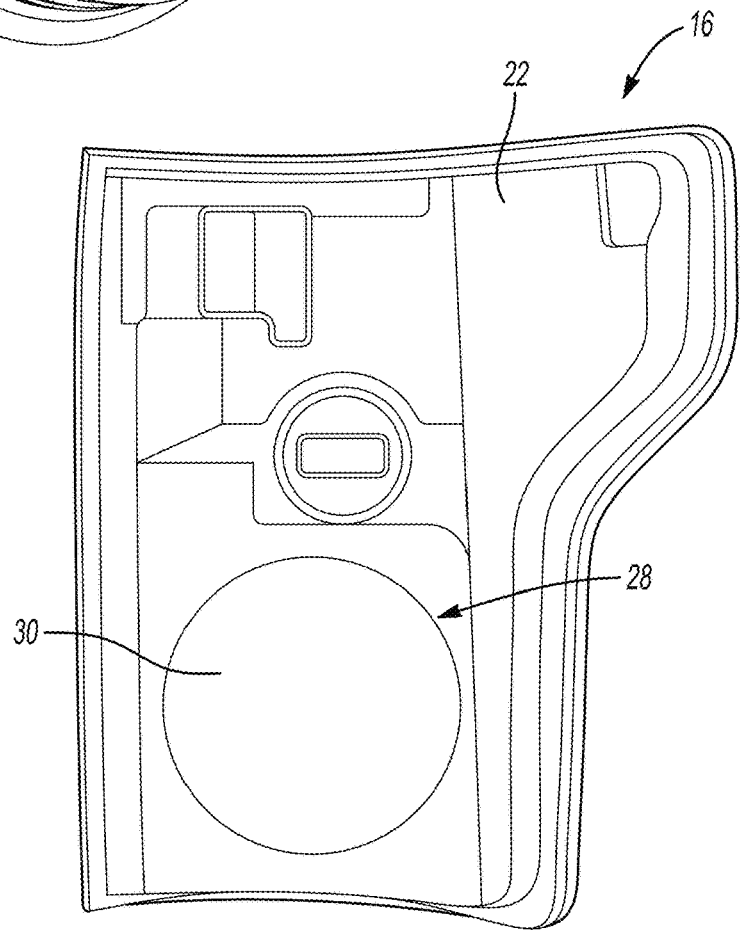
FIG. 5 is a view similar to FIG. 3, but in FIG. 5 the cover is connected to the housing of the tail lamp assembly.

The radius R1 of the orifice 33, measured at locations other than the notches 54, is marginally larger than the radius R2 of the lip 32, measured at locations other than the tabs 34, such that the lip 32 can fit relatively snugly into the orifice 33. The tabs 34 project from the lip 32 such that the effective radius R3 of the lip 32, measured to include the tabs 34, is greater than R1. The radius R4 of the orifice 33, measured at locations of the notches 54, is R4, which is greater than R3. Accordingly, when the cover 28 is in a first rotational orientation in which the tabs 34 are circumferentially aligned with the notches 54, the cover 28 may be selectively attached and detached from the housing 22. In particular, in the first rotational orientation, at least a portion of the lip 32 may project into the orifice 33 by movement of the cover 28 along axis A such that the tabs 34 are on an opposite side of the housing 22 as the main body portion 30. In this configuration, at least a portion of the sensor 24 is also within the orifice 33. The main body portion 30 is sized such that it cannot enter the orifice 33 and, as shown in FIG. 5, is configured to cover the entire orifice 33, including the notches 54.

With the cover 28 in the first rotational orientation, and with the lip 32 inserted into the orifice 33 such that the tabs 34 are on an opposite side of the housing 22 as the main body portion 30, the cover 28 can be moved to a second rotational orientation by rotating the cover 28 about the axis A (which, in this configuration, may be concentric with center C). In the second rotational orientation, the tabs 34 and notches 54 are not aligned. As such, the cover 28 is not removable from the housing 22. Further, in this example, one or more surfaces of the main body portion 30, lip 32, tab 34, housing 22, and/or edge 52 may be inclined or ramped such that rotation of the cover 28 into the second rotational orientation establishes an interference fit between the cover 28 and the housing 22. While an interference fit is mentioned, this disclosures extends to other types of fits, including fits between the cover 28 and housing 22 that resists movement of the cover 28 relative to the housing 22 and that does not require the use of tools.

In one example, the cover 28 is rotated substantially 900 about axis A when moving between the first and second rotational orientations. In this regard, the cover 28 and housing 22 may be deemed to establish a quarter-turn fastener. This disclosure is not limited to quarter turn fasteners, and extends to other connections that do not require the use of tools, including other rotational fasteners that involve rotations by amounts other than 90°.

Further, the sensor 24 may be electrically connectable to one or more wire harnesses arranged within the housing 22 and accessible via the orifice 33. The wire harnesses may be connectable to the sensor 24 when the cover 28 is detached from the housing 22. The wire harnesses may be of a length so as to not interfere with the above-discussed techniques for connecting the cover 28 to the housing 22.

It should be understood that terms such as "about," "substantially," and "generally" are not intended to be boundaryless terms, and should be interpreted consistent with the way one skilled in the art would interpret those terms. Further, directional terms such as "rear," "front," "top," "bottom," "side," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A lamp assembly for a motor vehicle, comprising:
    a housing;
    a lens supported by the housing;
    a light source, wherein the lens covers the light source from an exterior perspective;
    a sensor; and
    a cover configured to support the sensor relative to the housing such that the lens covers the sensor from the exterior perspective, wherein the cover is configured to connect to the housing without the use of tools.

2. The lamp assembly as recited in claim 1, wherein the cover is rotatable relative to the housing between:
    a first rotational orientation in which the cover may be selectively attached and detached from the housing, and
    a second rotational orientation in which the cover and housing are configured to establish an interference fit.

3. The lamp assembly as recited in claim 2, wherein the cover and housing are configured such that the cover rotates substantially 90° relative to the housing when moving between the first rotational orientation and the second rotational orientation.

4. The lamp assembly as recited in claim 2, wherein the housing includes an orifice configured to receive at least a portion of the cover and at least a portion of the sensor.

5. The lamp assembly as recited in claim 4, wherein the orifice is defined about an axis, and wherein the cover is configured to rotate about the axis when between the first rotational orientation and the second rotational orientation.

6. The lamp assembly as recited in claim 4, wherein the cover and the sensor are configured to be at least partially inserted into, or removed from, the orifice when the cover is in the first rotational orientation.

7. The lamp assembly as recited in claim 6, wherein, when the cover and the sensor are at least partially in the orifice, movement of the cover to the second rotational orientation establishes an interreference fit between the cover and the housing.

8. The lamp assembly as recited in claim 7, wherein, when the cover and the sensor are at least partially in the orifice and when the cover is in the second rotational orientation, the sensor is directed toward one or both of a side and a rear of the motor vehicle.

9. The lamp assembly as recited in claim 8, wherein the sensor is an Advanced Driver Assistance System (ADAS) sensor.

10. The lamp assembly as recited in claim 2, wherein:
    the cover includes a lip, and
    the lip is configured to project into an orifice of the housing when the cover is in the first rotational orientation.

11. The lamp assembly as recited in claim 10, wherein:
the cover includes a main body section configured to cover the sensor and the orifice from at least one perspective when the cover is connected to the housing.

12. The lamp assembly as recited in claim 10, wherein:
the lip is substantially circular, and
a seal supported on the lip is configured to establish a seal between the cover and the housing when the cover is connected to the housing.

13. The lamp assembly as recited in claim 1, wherein the cover includes a frame configured to support the sensor.

14. The lamp assembly as recited in claim 1, wherein, when the sensor is in use, signals emitted by the sensor pass through the lens after emission, and signals traveling to the sensor first pass through the lens before reaching the sensor.

15. The lamp assembly as recited in claim 1, wherein the light source is a bulb.

16. A lamp assembly for a motor vehicle, comprising:
a housing;
a sensor; and
a cover configured to support the sensor relative to the housing, wherein the cover is configured to connect to the housing without the use of tools,
wherein the cover is rotatable relative to the housing between a first rotational orientation in which the cover may be selectively attached and detached from the housing, and a second rotational orientation in which the cover and housing are configured to establish an interference fit,
wherein the cover includes a lip,
wherein the lip is configured to project into an orifice of the housing when the cover is in the first rotational orientation,
wherein the lip includes at least one tab projecting outwardly therefrom,
wherein the orifice is arranged about an axis, and
wherein, when the cover is connected to the housing and when the cover is in the second rotational orientation, the arrangement of the at least one tab relative to the housing restricts movement of the cover along the axis.

17. The lamp assembly as recited in claim 16, wherein:
when the cover is in the first rotational orientation, the arrangement of the at least one tab relative to the housing does not restrict movement of the cover along the axis.

18. A lamp assembly for a motor vehicle, comprising:
a housing;
a sensor; and
a cover configured to support the sensor relative to the housing, wherein the cover is configured to connect to the housing without the use of tools,
wherein the cover includes a frame configured to support the sensor,
wherein the frame includes a plurality of support assemblies,
wherein each support assembly includes a slot and a deflectable leg biased toward a center of the slot, and
wherein a housing of the sensor includes projections configured to be received in a respective one of the slots and such that a respective deflectable leg applies a force thereto.

19. The lamp assembly as recited in claim 18, wherein each deflectable leg includes a tab and each projection includes a recess configured to receive a corresponding one of the tabs.

* * * * *